Feb. 1, 1949.   C. S. WOOLFORD   2,460,327
SOLDER WIPER MECHANISM WITH SHIELDING MEANS
Filed July 7, 1947   3 Sheets-Sheet 1
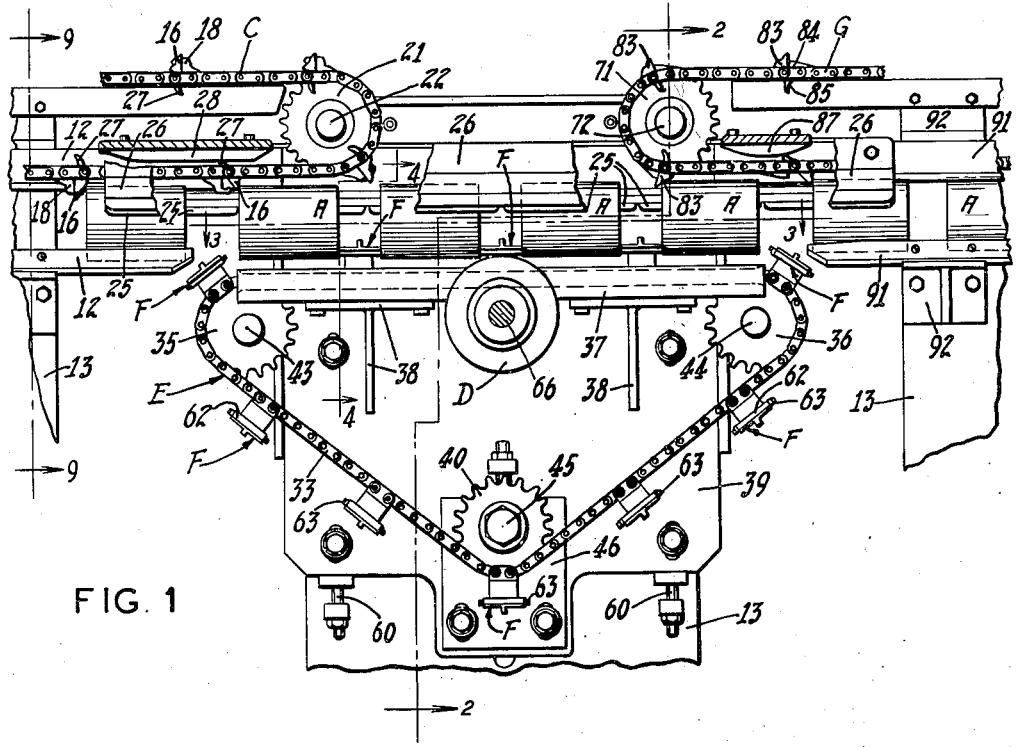
FIG. 1
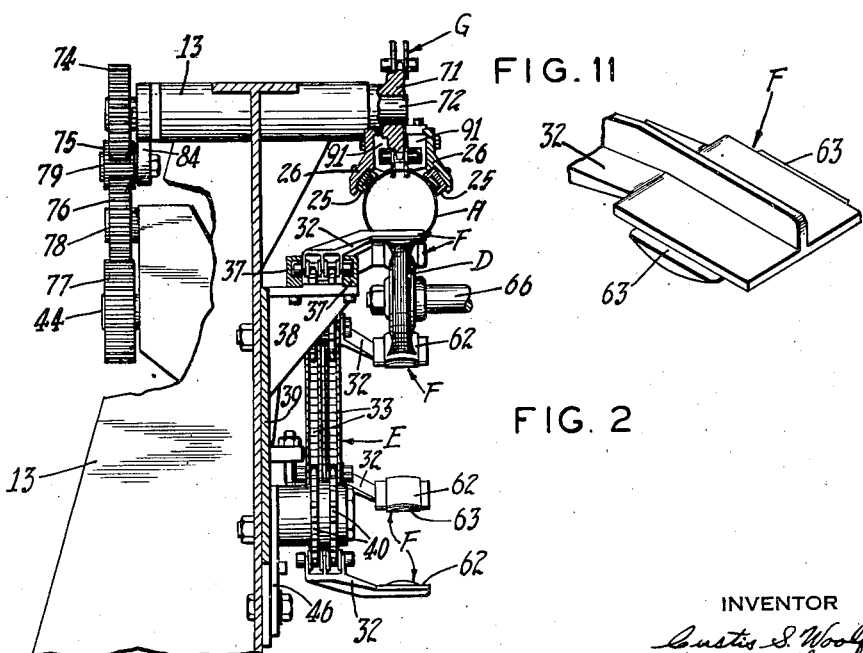
FIG. 11
FIG. 2
INVENTOR
Custis S. Woolford
BY Ivan D. Thornburgh
Charles H. Lane
ATTORNEYS Feb. 1, 1949. C. S. WOOLFORD 2,460,327
SOLDER WIPER MECHANISM WITH SHIELDING MEANS
Filed July 7, 1947 3 Sheets-Sheet 2

INVENTOR
Custis S. Woolford
BY Ivan D. Thornburgh
Charles H. Erne
ATTORNEYS

Feb. 1, 1949.   C. S. WOOLFORD   2,460,327
SOLDER WIPER MECHANISM WITH SHIELDING MEANS
Filed July 7, 1947                       3 Sheets-Sheet 3

INVENTOR
Custis S. Woolford
BY Ivan P. Thornburgh
Charles H. Erne
ATTORNEYS

Patented Feb. 1, 1949

2,460,327

UNITED STATES PATENT OFFICE 2,460,327

SOLDER WIPER MECHANISM WITH SHIELDING MEANS

Custis S. Woolford, South Orange, N. J., assignor to American Can Company, New York, N. Y., a corporation of New Jersey Application July 7, 1947, Serial No. 759,420

6 Claims. (Cl. 113—97)

1

The present invention relates to a solder wiper mechanism for can body side seam soldering machines and has particular reference to devices which are interposable into the spaces between can bodies moving in a continuous procession for propelling the bodies and for completely shielding their open ends against the entrance of solder pellets or other foreign matter which may be thrown off by the wiper. This is an improvement on the Solder wiper disclosed in United States Patent 1,985,906, issued January 1, 1935, to H. F. Smith, and on my own United States Patent 2,161,839, issued June 13, 1939, on Solder wiper.

An object of the invention is the provision of a shielding device for a solder wiper of a can body side seam soldering machine wherein the device is interposable into the space between two adjacent can bodies moving in a continuous procession for advancing the leading body while simultaneously filling or blocking off the entire space between the bodies to prevent the entrance into the bodies of solder pellets or other foreign matter which may be thrown off by the wiper during the wiping operation.

Another object is the provision of such a shielding device wherein several of the bodies moving in a continuous procession are interlocked with several shields in overlapping relation in such a manner as to present a long continuous smooth surface to the wiping device so that wiping of the freshly soldered side seams of the bodies may be effected efficiently while preventing spattering of the removed solder.

Still another object is the provision in such a solder wiper mechanism, of can body advancing devices which operate to increase the space between the moving bodies as they approach the shielding device and as they leave the shielding device to facilitate entrance of the shields into and removal of the shields from the open ends of the bodies so as to completely fill the space between the bodies while maintaining the bodies in timed and spaced order.

Numerous other objects and advantages of the invention will be apparent as it is better understood from the following description, which, taken in connection with the accompanying drawings, discloses a preferred embodiment thereof.

2

Referring to the drawings:

Figure 1 is a side elevation of the wiper section of a soldering machine embodying the instant invention, with parts broken away;

Fig. 2 is a transverse section taken substantially along the broken line 2—2 in Fig. 1, with parts broken away;

Fig. 11 is a perspective view of one of the shielding members used in the machine.

Figure 3:
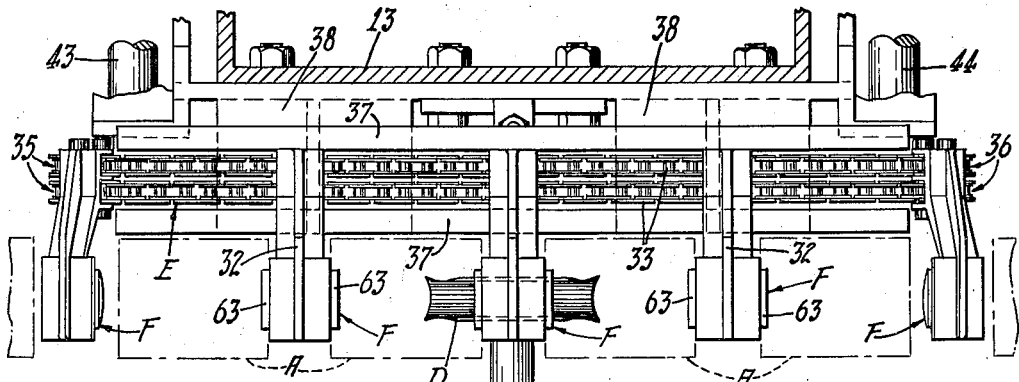
Fig. 3 is a horizontal section taken substantially along the line 3—3 in Fig. 1, with parts broken away.

As a preferred embodiment of the instant invention the drawings illustrate principal parts of the wiper section of a can body side seam soldering machine of the type disclosed in the above mentioned Smith and Woolford patents. In such a machine, open end can bodies A (Figs. 1, 3 and 4) having side seams B freshly coated with molten solder applied to the outside of the seam, are conveyed in spaced and timed relation in a continuous procession, by an endless chain conveyor C, along a straight line path of travel extending longitudinally of the machine past a solder wiper D where excess solder on the seams is wiped off.

In the instant mechanism, the feed-in conveyor C terminates short of the wiper D, and the can bodies still in spaced and timed relation are transferred by the conveyor C to a shielding conveyor E carrying paddles or shields F which move into and fill the spaces between the bodies and simultaneously propel the bodies past the wiper D for the wiping operation. The shields F protect the interior of the can bodies against the entrance of solder pellets or other foreign matter which may be thrown off by the wiper D.

Beyond the wiper D, the shields F move away from the wiped can bodies and the bodies then come under the control of a discharge conveyor G. This discharge conveyor propels the wiped bodies, still in their spaced and timed relation, to any suitable place of deposit. All of the conveyors C, E, G, travel at the same lineal speed so as to maintain the spaced and timed relation of the bodies throughout their entire travel through the mechanism.

During the passage of the bodies A through the solder applying portion of the machine, at the left as viewed in Fig. 1, they travel along and are supported by an outside horn or horse which comprises upper and lower pairs of spaced and parallel guide rails 12. These horn rails 12 are secured at spaced intervals to brackets bolted to a frame 13 which constitutes the main frame of the soldering machine.

Figure 7:
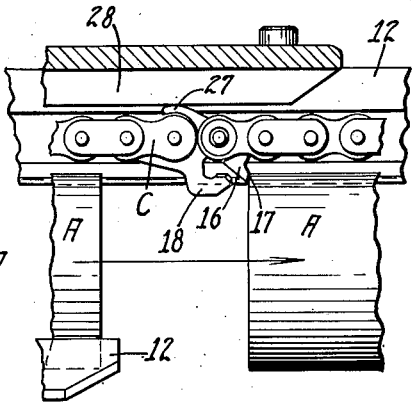
Fig. 7 is an enlarged elevational detail illustrating how the space between two adjacent can bodies is increased for the entrance of a shield therebetween, with parts broken away and parts shown in section.
Figure 9:
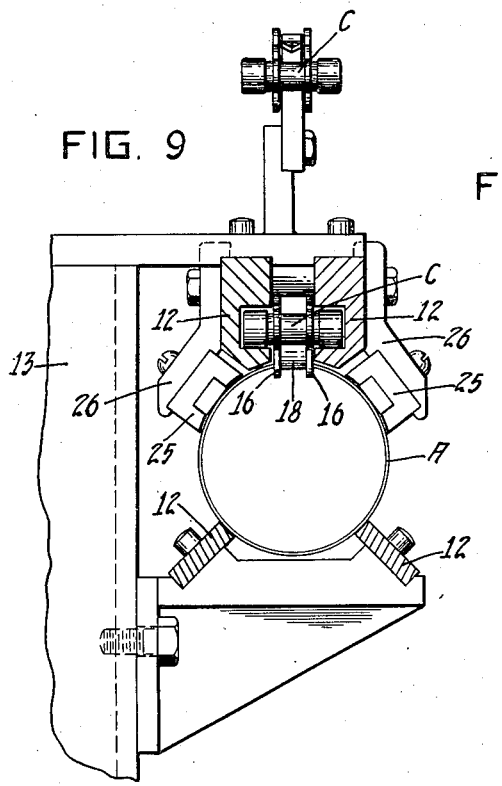
Fig. 9 is an enlarged sectional view taken substantially along the line 9—9 in Fig. 1, with parts broken away.

The bodies are propelled along and inside the horn rails 12, in their spaced and timed relation with their side seams disposed at the bottom, by the conveyor C which comprises an endless feed-in chain having feed dogs 16 (see also Fig. 7) pivotally mounted thereon at spaced intervals. Each feed dog 16 is formed with a pair of rounded noses 17 for propelling engagement with the rear edge of the bodies. These noses 17 straddle a gripper finger 18 (see also Fig. 9) secured to the conveyor adjacent the feed dogs 16 and cooperate with the gripper finger in holding a can body interposed between them so that the body will be prevented from turning while advancing. This gripping of the body maintains its side seam in proper position for soldering and wiping.

The feed-in conveyor C operates over a sprocket 21 mounted on a shaft 22 journaled in bearings formed in the main frame 13. The shaft may be driven in any suitable manner. The horn rails 12 terminate adjacent the sprocket 21 and at this place the support of the moving can bodies is transferred to a series of permanent magnets 25 (Figs. 1, 2 and 9) arranged in pairs adjacent the upper horn rails 12. The magnets extend longitudinally of the mechanism parallel with and adjacent the shielding conveyor E and between the feed-in conveyor C and the discharge conveyor G. These magnets are secured in brackets 26 bolted to the upper horn rails 12. There is a short overlapping of the horn rails and the magnets to insure support of the bodies during the transfer.

As soon as a can body rides off the horn rails 12 and onto the permanent magnets 25, it is accelerated smoothly a short distance to increase the space between it and the next following body. This is effected by a suitable advancing movement of the feed dog 16. For this purpose the dog is formed with a tail 27 (see Fig. 7) which engages against a stationary cam 28 (see also Fig. 1) disposed adjacent the feed-in conveyor sprocket 21 and secured to the upper horn rails 12. Engagement of this cam by the feed dog tail 27, rocks the dog and this advances the body while at the same time disengages it from the gripper finger 18. This frees the body from the feed-in conveyor C.

The advanced can body A now suspended from the magnets 25 is immediately engaged adjacent its side seam B by a paddle or shield F (Figs. 1 and 3) which moves up into the increased space between the two adjacent can bodies. There are a plurality of these paddles F, formed on individual arms 32 (see also Figs. 3 and 4) secured at spaced intervals along a double endless chain 33 which constitutes the shielding conveyor E. The upper runs of the chains extend along a straight line path of travel immediately below and parallel with the can bodies A depending from the magnets 25 and operated over a pair of sprockets 35, 36 disposed one on each side of the wiper D as shown in Fig. 1. These upper runs of the chains are supported on rails 37 secured to brackets 38 formed on a vertically adjustable plate 39 bolted to the main frame 13. The lower runs of the chains operate over double tightener sprockets 40.

The chain sprockets 35, 36 are mounted respectively on rotatable shafts 43, 44 which are journaled in transverse bearings formed on the vertically adjustable plate 39. The tightener sprockets 40 are mounted on a stud 45 carried in a bracket 46 adjustably secured to the plate 39 for maintaining the conveyor E in a taut condition.

Figure 8:
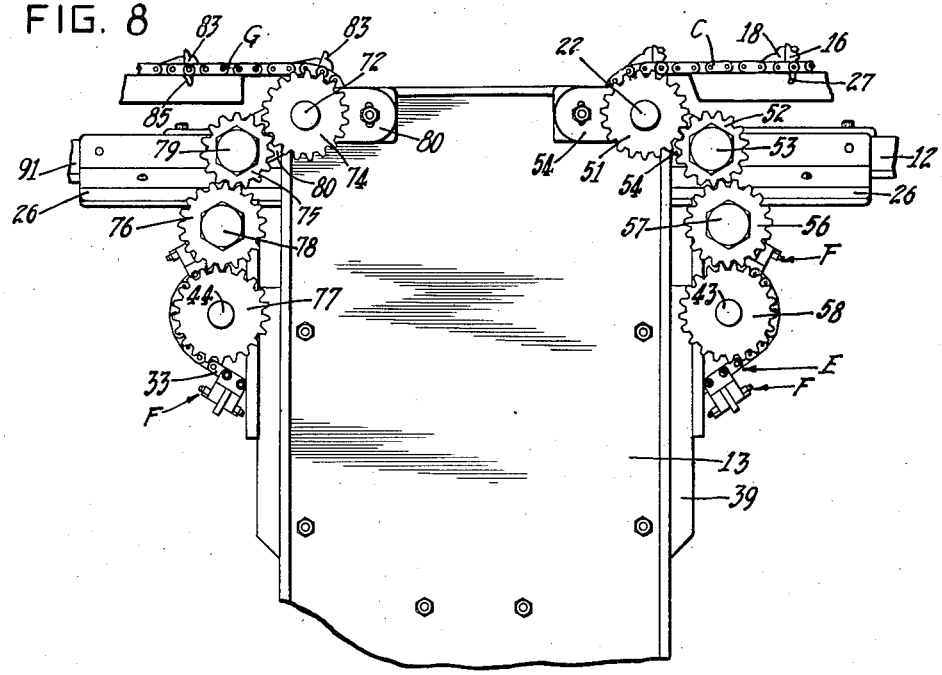
Fig. 8 is a rear view of the machine shown in Fig. 1, with parts broken away.

The conveyor E is driven preferably from and in time with the feed-in conveyor C. For this purpose the feed-in conveyor shaft 22 carries a gear 51 (see Fig. 8) which meshes with and drives a gear 52 mounted on a stud 53 carried in an arm 54 adjustably secured to the plate 39. The gear 52 meshes with and drives a gear 56 mounted on a stud 57 secured in the plate 39. This gear 56 meshes with and drives a gear 58 which is mounted on the shaft 43 of the chain sprocket 35. It is through this gear train that the conveyor E is actuated at the proper speed and in the proper direction.

If vertical adjustment of the upper runs of the chains 33 of the conveyor E relative to the can bodies on the magnets 25 become necessary, this may be accomplished by shifting the adjusting plate 39 vertically. Adjusting screws 60 (Fig. 1) are provided for this purpose. Any adjustment of this plate may be compensated for by adjustment of the gear arm 54 to maintain proper meshing of the driving gears 51, 52, 56.

Figure 4:
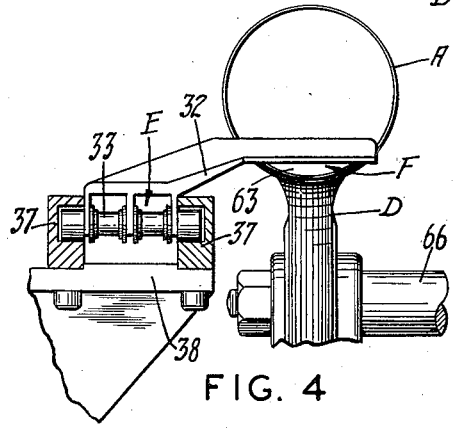
Fig. 4 is an enlarged sectional detail taken substantially along the broken line 4—4 in Fig. 1, with parts broken away.

The paddles or shields F carried on the conveyor E comprise flat rectangular shaped members 62 (Figs. 3, 4, 5 and 11) having a length substantially equal to the distance between two adjacent can bodies A moving in the procession of such bodies and having a width of at least twice the width of the wiper D. The bottoms of the shields as viewed in Figs. 4 and 5 are rounded or curved to correspond with the outside diameter or contour of the can bodies A.

At its ends each shield member 62 is formed with overhanging extensions 63 which in cross-section are similar to the shape of the member 62 but slightly smaller by a dimension equal to the thickness of the material from which the bodies are made. This difference in size between the shield member 62 and its end extensions 63 provides an inwardly extending step 64. The curved bottom of the extensions 63 are flattened slightly to compensate for the double thickness of material at the side seams of the bodies.

Figure 5:
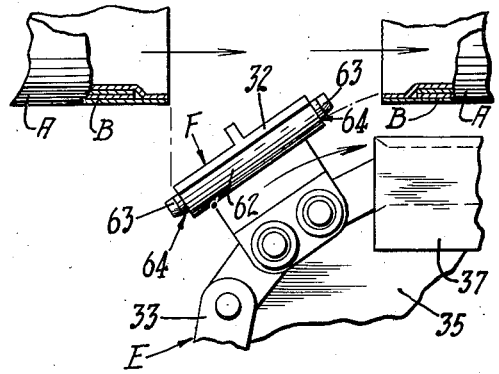
Figs. 5 and 6 are enlarged elevational details illustrating different positions of certain of the parts of the wiper mechanism incidental to shielding the interior of a pair of adjacent moving can bodies, with parts broken away and parts shown in section.
Figure 6:
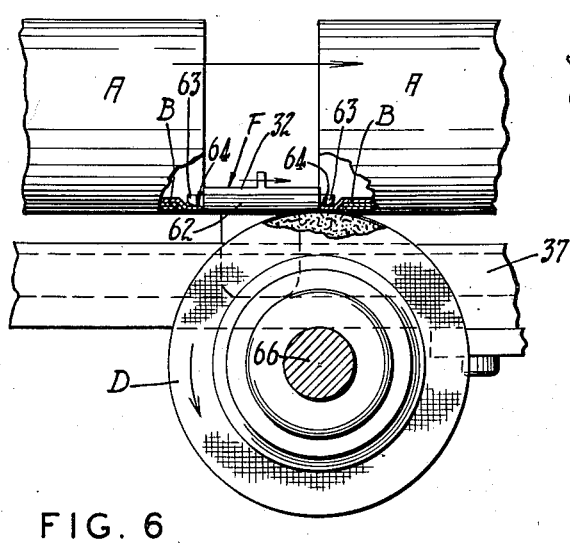

Hence as the moving conveyor E carries a shield F upwardly around the sprockets 35, the shield moves up into the increased space between the two adjacent can bodies as mentioned hereinbefore and as clearly shown in Fig. 5. As the shield continues its upward travel and starts to move along the upper run of the conveyor E, it comes into a flat or horizontal position with its leading extension 63 in position inside the advanced body A and with its adjacent step 64 in engagement with the rear edge of the body as best shown in Fig. 6. In this position of the shield its leading extension 63 overlaps the edge of the body and the curved bottom of the shield member 62 is flush with the outside surface of the body. In this position the moving shield F propels the engaged body along the magnets 25 and thus carries the body away from the feed dogs 16 on the feed-in conveyor C. Advancement of the body is thereafter effected by the shield.

When an advancing shield F and its engaged body has moved through a distance substantially equal to the length of one body, the next following or subsequent body in the procession is advanced by its feed dog 16 in the same manner and for the same purpose as explained above. This advancement of the next following can body brings its leading edge into engagement with the rear step 64 of the shield which is propelling the leading can body as shown in Fig. 6. The rear extension 63 of the shield projects into and overlaps the leading edge of the following can body.

Thus the shield F is interposed into and completely fills the space between the two adjacent can bodies A adjacent their side seams with the bottom curved face of the shield flush with the outer surface of the bodies and with the end extensions 63 of the shields projecting into and overlapping the edges of the bodies. As each shield moves into its space between two adjacent can bodies it engages and propels the leading body and thus a continuous procession of bodies in spaced and timed order with the spaces between them completely blocked off, advances along the magnets 25. In this relation, the shields F propel or advance the procession of bodies into engagement with the wiper D for the side seam wiping operation as best shown in Figs. 1, 4 and 6.

The solder wiper D comprises a rotating wiper wheel preferably constructed of cloth, fibre or other suitable wiping material. This wheel is disposed with its outer periphery adjacent the path of travel of the side seams of the moving bodies and is mounted on one end of a shaft 66 (Figs. 1, 2, 3 and 4) which is journaled in suitable bearings formed in the main frame 13. The wheel is rotated rapidly in any suitable manner in a direction opposite to that of the travel of the bodies.

As each can body A in the procession moves past the wiper wheel, the outer periphery of the wheel engages against the body side seam and wipes away any loose or soft excess solder adhering thereto. Since the spaces between the moving can bodies are completely bridged by the shields F, the wiper wheel engages against the bottoms of the shields as they pass over the wheel.

Hence any solder pellets or other foreign matter which may be thrown off or catapulted from the rapidly turning wheel, is prevented from entering the interiors of the can bodies and hence the bodies are protected against contamination during the wiping operation. The stepped and curved bottom shields overlapping into the ends of the bodies cooperate with the bodies in presenting a continuous smooth surface to the wiper wheel and thus eliminate any "digging-in" of the edges of the bodies as they pass over the wheel. This prevents spattering of the solder taken up by the wheel, especially when the wheel becomes loaded with the solder it has removed from the bodies.

After passing beyond the solder wiper D, the fully wiped can bodies move into the control of the discharge conveyor G. This conveyor is disposed above the path of travel of the can bodies and overlaps the shielding conveyor E to insure transfer of the bodies from one to the other. The discharge conveyor G comprises an endless chain which operates over a sprocket 71 (Figs. 1 and 2) mounted on a transverse shaft 72 journaled in a bearing formed on the main frame 13.

The shaft 72 is rotated continuously and in time with the conveyors C and E by a gear 74 carried on one end of the shaft. The gear 74 is rotated through a train of meshing gears 75, 76, 77, the last mentioned of which is carried on the sprocket shaft 44 of the shielding conveyor. Gear 76 is mounted on a stud 78 secured in the adjustable plate 39, while gear 75 is mounted on a stud 79 carried in an adjustable arm 80 pivotally mounted on the shaft 72 and secured to the main frame 13 (see Fig. 7).

Figure 10:
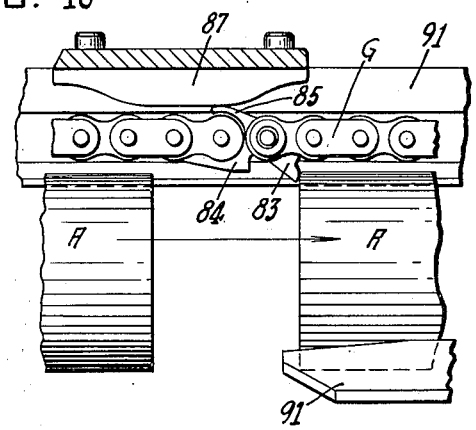
Fig. 10 is an enlarged elevational detail similar to Fig. 5 and showing a portion of the machine at the right in Fig. 1.

As a can body A in the procession approaches the discharge conveyor G, a discharge dog 83 (Figs. 1 and 10) carried on the conveyor engages behind the upper rear edge of the can body and rides along with the body which is still being propelled by a shield F. There are a plurality of these discharge dogs 83 and they are pivotally mounted on the conveyor chain at spaced intervals therealong. The dogs normally engage against stop elements 84 secured to the chain adjacent each dog. Each dog is formed with a tail 85 which projects inwardly beyond the chain.

When a wiped can body A reaches the termination of the upper run of the shielding conveyor E, the tail 85 of the adjacent discharge dog 83 engages against a stationary cam 87 secured to the discharge horn and this rocks the dog forward away from its stop element 84 and thus smoothly accelerates the body a sufficient distance to disengage the body from the inwardly projecting end extension 63 of the adjacent shield F. With the body thus disengaged from the shield, the latter readily passes downwardly around the sprocket 36 of the shielding conveyor E for reuse.

After such a body disengaging operation the tail 85 of the discharge dog 83, rides off stationary cam 87 and the dog returns smoothly against its stop element 84 where it continues the advancement of the body to any suitable place of discharge. During this advancement of the body it rides off the permanent magnets 25 and passes along a continuing outside horn or horse comprising upper and lower horn rails 91 (Fig. 1) secured to brackets 92 bolted to the main frame 13 in a manner similar to the feed-in horn rails 12. This completes the cycle of operation of the mechanism.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A solder wiping mechanism for soldering machines, comprising means for supporting in spaced relation moving open end can bodies having freshly soldered side seams with said seams exposed along a longitudinal line, a wiper located adjacent said supporting means for wiping said soldered side seams, a feed-in conveyor for feeding said can bodies longitudinally into said supporting means, a discharge conveyor for discharging said can bodies longitudinally from said supporting means, a shielding conveyor longitudinally disposed between said feed-in conveyor and said discharge conveyor, a plurality of shielding paddles carried on said shielding conveyor and interposable between said spaced bodies as received from said feed-in conveyor and for propelling them along said support and past said wiper and for simultaneously completely shielding the open ends of the said passing bodies against the entrance of solder into their interiors, said paddles delivering the wiped bodies to said discharge conveyor, and means on said feed-in conveyor and on said discharge conveyor for temporarily increasing the space between adjacent bodies during their transfer from one conveyor to the other to provide for the entrance and withdrawal of a paddle between its associated bodies.

2. A solder wiping mechanism for soldering machines, comprising means for supporting in spaced relation moving open end can bodies having freshly soldered side seams with said seams exposed along a longitudinal line, a wiper located adjacent said longitudinal line for wiping the side seams, a feed-in conveyor and a discharge conveyor located along said longitudinal line for respectively feeding said can bodies longitudinally into and from said supporting means, feed dogs carried on said feed-in and on said discharge conveyors for propelling said can bodies along said supporting means, a shielding conveyor longitudinally disposed between said feed-in and discharge conveyors, a plurality of shielding paddles carried on said shielding conveyor and interposable between the spaced bodies as received from said feed-in conveyor for propelling the bodies along said support and past said wiper, said paddles completely shielding the open ends of the bodies against the entrance of solder from the wiper, and cam means disposed adjacent the path of travel of said feed dogs for shifting each dog and the can body engaged therewith to temporarily increase the space between said body and an adjacent body during transfer into and from said shielding conveyor to provide for entrance and withdrawal of said paddles.

3. A solder wiping mechanism for soldering machines, comprising means for supporting can bodies in spaced end to end relation for movement in the direction of the can body axes and with the side seams of the bodies disposed in a line, a wiper located adjacent said supporting means for wiping said side seams, only one conveyor disposed adjacent the supporting means at said wiper, said conveyor having means for movement parallel to the line of the can seams and having elements mounted thereon with means to engage the elements with said can bodies for advancing the bodies along said supporting means and past said wiper, each element having such structure with relation to the structure of the conveyor that when it is engaged for advancing a can body it extends backward to a position of engagement with the following adjacent advancing can body to completely bridge the intervening space therebetween as a said body passes said wiper for shielding the open ends of the bodies against entrance into their interior of solder thrown off from said wiper.

4. A solder wiping mechanism for soldering machines, comprising means for supporting can bodies in spaced end to end relation for movement in the direction of the can body axes with the side seams of the bodies disposed in a line, a wiper located adjacent said supporting means for wiping said side seams, only a single can body conveyor disposed adjacent the supporting means at said wiper and having movement parallel to said line of body seams, shielding elements mounted on said conveyor, means to engage said elements with said can bodies for advancing the bodies along said supporting means and past said wiper, each element having an exterior curvature conforming to the cylindrical contour of and disposed substantially flush with the exterior surface of said can bodies, said element also closely fitting the rear edge of an engaged can body and extending back into close engagement with the forward edge of the following adjacent body and completely bridging the intervening space therebetween as the bodies pass said wiper for shielding the open ends of the bodies against entrance into their interior of solder thrown off from said wiper.

5. A solder wiping mechanism for soldering machines, comprising means for supporting can bodies in spaced end to end relation for movement in the direction of the can body axes with the side seams of the bodies disposed in a line, a wiper located adjacent said supporting means for wiping said side seams, a feed-in conveyor disposed adjacent the supporting means for feeding can bodies longitudinally thereof toward said wiper, a shielding conveyor having movement parallel to said line of body seams, shielding elements mounted on said conveyor, means to engage said elements with said can bodies for advancing the bodies along said supporting means and past said wiper, each element closely fitting the rear edge of an engaged forward can body and extending back into close engagement with the forward edge of the following adjacent body and completely bridging the intervening space therebetween as the bodies pass said wiper for shielding the open ends of the bodies against entrance into their interior of solder thrown off from said wiper, and means operable with said feed-in conveyor to temporarily increase the space between adjacent bodies to admit a said shielding conveyor element as the bodies pass from said feed-in to said shielding conveyors.

6. A solder wiping mechanism for soldering machines, comprising means for supporting can bodies in spaced end to end relation for movement in the direction of the can body axes with the side seams of the bodies disposed in a line, a wiper located adjacent said supporting means for wiping said side seams, a shielding conveyor disposed adjacent the supporting means at said wiper and having movement parallel to said line of body seams, shielding elements mounted on said conveyor, means to engage said elements with said can bodies for advancing the bodies along said supporting means and past said wiper, each element closely fitting the rear edge of an engaged can body and extending back into close engagement with the forward edge of the following adjacent body and completely bridging the intervening space therebetween as the bodies pass said wiper for shielding the open ends of the bodies against entrance into their interior of solder thrown off from said wiper, a discharge conveyor disposed adjacent the supporting means for feeding can bodies from said shielding conveyor, and means operable with said discharge conveyor to temporarily increase the space between adjacent bodies for withdrawal of said shielding conveyor element from between the wiped bodies.

CUSTIS S. WOOLFORD.

REFERENCES CITED

The following references are of record in the file of this patent:

UNITED STATES PATENTS

| Number | Name | Date |
| --- | --- | --- |
| 1,589,059 | Fink | June 15, 1926 |
| 1,740,863 | Kruse | Dec. 24, 1929 |
| 1,985,906 | Smith | Jan. 1, 1935 |
| 2,023,232 | Kruse | Dec. 3, 1935 |
| 2,161,839 | Woolford | June 13, 1939 |
| 2,266,792 | O'Neil | Dec. 23, 1941 |
| 2,322,221 | Cereghino | June 22, 1943 |